Patented Oct. 31, 1922.

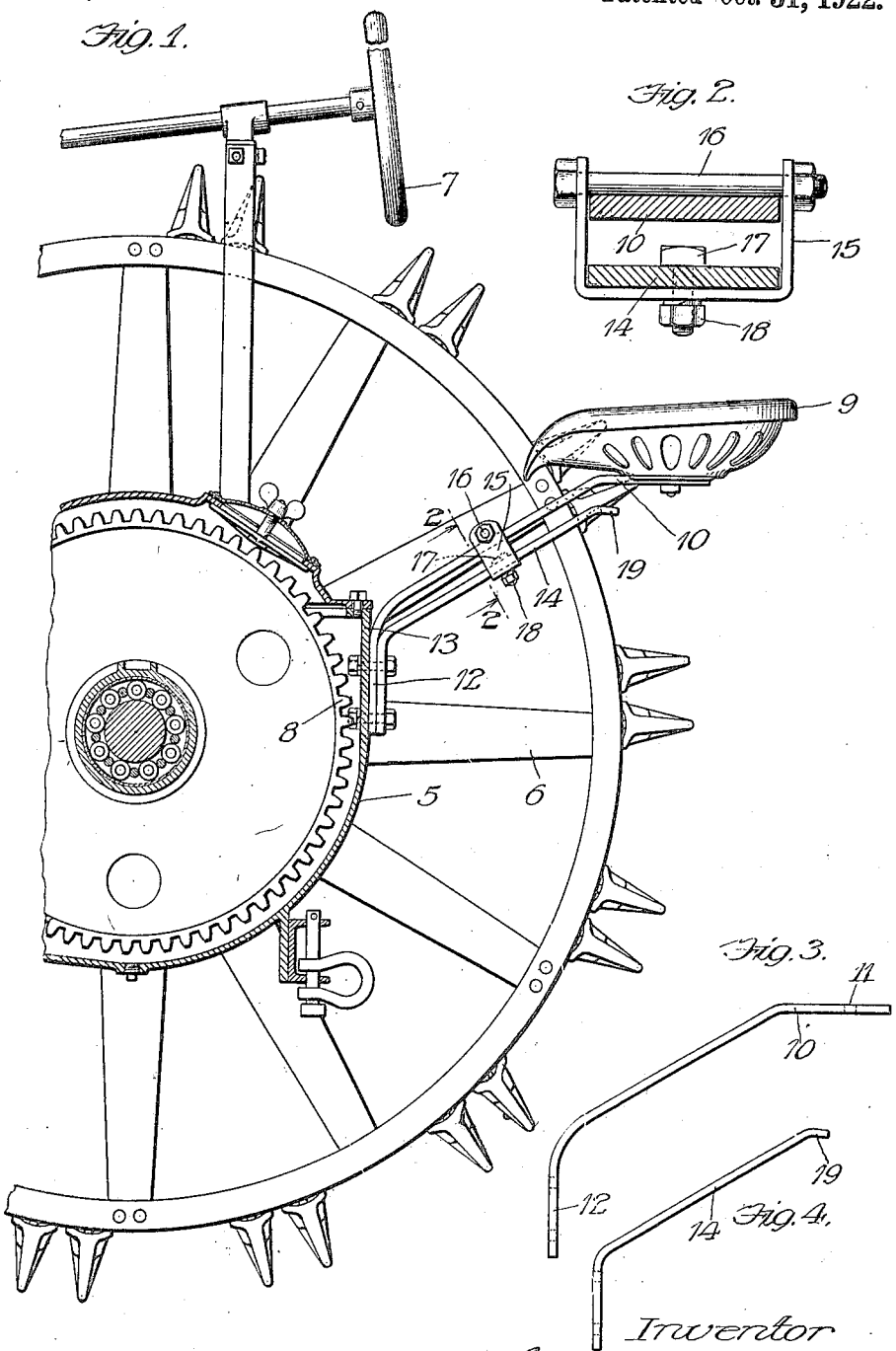

1,433,720

UNITED STATES PATENT OFFICE.

ROBERT O. HENDRICKSON, OF RACINE, WISCONSIN, ASSIGNOR TO J. I. CASE PLOW WORKS COMPANY, OF RACINE, WISCONSIN, A CORPORATION OF DELAWARE.

SEAT SUPPORT.

Application filed February 9, 1920. Serial No. 357,175.

*To all whom it may concern:*

Be it known that I, ROBERT O. HENDRICKSON, a citizen of the United States, residing at Racine, county of Racine, State of Wisconsin, have invented certain new and useful Improvements in Seat Supports, of which the following is a specification.

My invention relates more particularly to seats for tractors, though it will be obvious from the following description that it is also applicable to a variety of vehicles, agricultural implements and the like. My invention has for its object to provide a seat support which will have a desirable resilience and capacity for movement to avoid unnecessary jar to the person occupying the seat, and which will at the same time prevent excess movement and insure against accident in case a strain beyond the normal is put upon the support. With these objects in view my invention consists in the construction hereinafter described and pointed out in the claim.

Referring to the drawing, Fig. 1 is a longitudinal section of so much of a tractor as is necessary to understand my invention, having the latter applied thereto; Fig. 2 is a transverse section on the plane of the line 2—2 of Fig. 1; and Figs. 3 and 4 are elevations of details.

Referring first to Fig. 1, I have shown my improved seat support as mounted upon a tractor construction of known design for the purpose of exemplification. In said figure the casing or frame of the machine is shown at 5 and one of the traction wheels thereof at 6. The steering wheel is indicated at 7 and the gear wheel for driving traction wheel 6 at 8.

The seat 9 proper, may be of any usual or approved construction and is mounted upon a resilient flat metal bar or strap 10, the upper end of which is bent into horizontal position and formed with a bolt-hole 11 for receiving the bolt which secures the seat, and the other end of which strap or bar is bent into the vertical as at 12 to adapt it to be secured to the vertical part 13 of the casing. The bar or strap 10 is of such strength and resilience as to support the weight of the operator in normal operation of the machine with a comfortable amount of spring. Beneath this regular spring 10 and secured to the machine by the same bolts is a supplemental or emergency spring 14, preferably of somewhat greater stiffness and formed of a milder or less hardened steel. A yoke piece 15 embraces the springs 10,14, the upper ends of the yoke being connected by a bolt 16 which partially limits the relative movement of the two springs, (see Fig. 2). The yoke is held in position on the auxiliary spring by means of a headed bolt 17 and nut 18.

In normal operation the spring 14 plays but little part, at most serving to cushion the movement of spring 10 only when the latter is subjected to unusual strains which cannot be taken up within the range of movement provided by the yoke 15. If, however, the spring 10 is broken the spring 14 acts as a safe guard, the yoke serving to hold the springs from complete separation and the seat dropping to rest upon the bent end 19 of the spring 14. If, however, the strain is so great as not to be sustained by the spring 14 the latter being of relatively malleable metal gives way slowly thus preventing injury to the operator.

I claim:

In a device of the class described, a vertical support, a main spring comprising a vertical end portion secured to said support, an inclined body portion and a substantially horizontal end portion, a seat mounted on said horizontal end portion, an auxiliary spring comprising a vertical end portion secured to said vertical support, and an inclined portion, the latter extending beneath and approximately parallel to the inclined portion of the main spring but spaced therefrom, a yoke surrounding said springs intermediate their ends and secured to one of them whereby in case of breakage of the main spring the seat will be temporarily supported by the auxiliary spring.

ROBERT O. HENDRICKSON.